(12) United States Patent
Gusat et al.

(10) Patent No.: US 12,547,911 B2
(45) Date of Patent: *Feb. 10, 2026

(54) CHARACTERIZING A COMPUTERIZED SYSTEM BASED ON CLUSTERS OF KEY PERFORMANCE INDICATORS

(71) Applicant: INTERNATIONAL BUSINESS MACHINES CORPORATION, Armonk, NY (US)

(72) Inventors: Mircea R. Gusat, Langnau am Albis (CH); Lili Lyubchova Georgieva, Sofia (BG); Serge Monney, Pully (CH); Roman Alexander Pletka, Uster (CH)

(73) Assignee: International Business Machines Corporation, Armonk, NY (US)

( * ) Notice: Subject to any disclaimer, the term of this patent is extended or adjusted under 35 U.S.C. 154(b) by 1016 days.

This patent is subject to a terminal disclaimer.

(21) Appl. No.: 17/651,386

(22) Filed: Feb. 16, 2022

(65) Prior Publication Data
US 2023/0259794 A1    Aug. 17, 2023

(51) Int. Cl.
*G06N 5/04* (2023.01)
*G06F 17/14* (2006.01)

(52) U.S. Cl.
CPC .............. *G06N 5/04* (2013.01); *G06F 17/142* (2013.01)

(58) Field of Classification Search
CPC ..... H04W 16/22; H04W 24/02; H04W 24/04; H04W 24/06; H04W 28/0226; H04W 28/0942
See application file for complete search history.

(56) References Cited

U.S. PATENT DOCUMENTS

| 10,785,090 B2 | 9/2020 | Vasseur |
| 10,897,389 B2 | 1/2021 | Thampy |
| 10,921,759 B2 | 2/2021 | Ma |
| 2016/0320768 A1 | 11/2016 | Zhao |

(Continued)

OTHER PUBLICATIONS

Assaf et al. "An Anomaly Detection and Explainability Framework using Convolutional Autoencoders for Data Storage Systems" IJCAI-20 (Year: 2020).*

(Continued)

*Primary Examiner* — Chris Parry
*Assistant Examiner* — Abderrahmen Chouat
(74) *Attorney, Agent, or Firm* — Anthony Curro (57) ABSTRACT

The invention is directed to characterizing a computerized system based on key performance indicators (KPIs). Channel the KPIs through n buffer channels, where n≥2. The KPIs are channeled by: accessing KPIs; clustering the KPIs accessed to obtain k clusters; and, for each cluster of the k clusters obtained, identifying n representative KPIs in each cluster as objects of n respective types and buffering KPI values of the n representative KPIs identified in respective ones of the n buffer channels. The KPI values buffered in the n buffer channels are then fed into respective input channels of a trained neural network. The neural network independently processes the KPIs in the input channels and produces output values in output of the inner layers. Eventually, the computerized system is characterized based on the output values produced, e.g., to detect an anomaly in the system.

23 Claims, 7 Drawing Sheets

(56) References Cited

U.S. PATENT DOCUMENTS

| | | | |
|---|---|---|---|
| 2020/0287923 A1 | 9/2020 | Raghavendra | |
| 2020/0322367 A1 | 10/2020 | Salvat Lozano | |
| 2021/0067401 A1 | 3/2021 | Abe | |
| 2023/0209367 A1* | 6/2023 | Chang | G06N 5/01 455/423 |
| 2024/0098569 A1* | 3/2024 | Keshavarz Hedayati | H04W 24/04 |

OTHER PUBLICATIONS

IBM, List of IBM Patents or Patent Applications Treated as Related, Appendix P, dated Feb. 17, 2022, 2 pages.

Pending U.S. Appl. No. 17/651,391, filed Feb. 16, 2022, entitled, "Characterizing a Computerized System With an Autoencoder Having Multiple Ingestion Channels", 35 pages.

Chakraborty, et al., "Root Cause Detection Among Anomalous Time Series Using Temporal State Alignment," arXiv:2001.01056v1, Jan. 4, 2020, 6 pgs. < https://arxiv.org/pdf/2001.01056.pdf>.

Grace Period Disclosure: "Cloud Causality Analyzer for Anomaly Detection," Lili Georgieva, Published Apr. 14, 2021, ETH, Department of Information Technology and Electrical Engineering, ETH Zurich, 80 pgs.

He et al., "MTAD-TF: Multivariate Time Series Anomaly Detection Using the Combination of Temporal Pattern and Feature Pattern," Wiley, Hindawi Complexity, vol. 2020, Article ID 8846608, Oct. 29, 2020, pp. 1-9, < https://downloads.hindawi.com/journals/complexity/2020/8846608.pdf>.

Paparrizos et al., "k-Shape: Efficient and Accurate Clustering of Time Series," SIGMOD '15, May 31-Jun. 4, 2015, ACM 978-1-4503-2758-9/15/05, 16 pgs., <http://www1.cs.columbia.edu/~jopa/Papers/PaparrizosSIGMOD2015.pdf>.

Qian et al., "Large-Scale KPI Anomaly Detection Based on Ensemble Learning and Clustering", Tech Science Press, Journal of Cyber Security, DOI:10.32604/jcs.2020.011169, JCS, 2020, vol. 2, No. 4, Oct. 19, 2020, pp. 157-166, <https://www.techscience.com/JCS/v2n4/40713>.

Qiu et al., "A Causality Mining and Knowledge Graph Based Method of Root Cause Diagnosis for Performance Anomaly in Cloud Applications," MDPI Applied Sciences 2020, 10, 2166, doi.org/10.3390/app10062166, filed Mar. 22, 2020, pp. 1-19, <https://www.mdpi.com/2076-3417/10/6/2166>.

Qiu et al., "KPI-TSAD: A Time-Series Anomaly Detector for KPI Monitoring in Cloud Applications," MDPI, Symmetry 2019, 11, 1350, doi: 10.3390/sym11111350, Nov. 1, 2019, 20 pgs. < https://www.mdpi.com/2073-8994/11/11/1350/htm>.

Roman, "Machine learning: Time-based anomaly detection (part 3)," Rohde & Schwarz, Mar. 17, 2020, pp. 1-13, [accessed Jun. 21, 2021], <https://www.rohde-schwarz.com/in/solutions/test-and-measurement/mobile-network-testing/ stories-insights/article-machine-learning-time-based-anomaly-detection-part-3-_253110.html>.

Assaf et al., "An Anomaly Detection and Explainability Framework using Convolutional Autoencoders for Data Storage Systems" Jan. 2021 Proceedings of the Twenty-Ninth International Joint Conference on Artificial Intelligence (IJCAI-20) Demonstrations Track, 2021, 3 pages.

Park et al., "Anomaly Detection for HTTP Using Convolutional Autoencoders" Nov. 12, IEEE, 2018, 18 pages.

Ray et al., "Anomaly Detection Using K-means Approach and Outliers Detection Technique" , Advances in Intelligent Systems and Computing ((AISC, vol. 742)) Aug. 31, 2018, 717 pages.

Tensorflow, "tf.keras.layers. DepthwiseConv2D" Apr. 8, 2021 verified on https://web.archive.org/web/20210408030050/https://www.tensorflow.org/api_docs/python/tf/keras/layers/DepthwiseConv2D, 2021, 4 pages.

Thalheim et al., "Sieve: Actionable Insights from Monitored Metrics in Microservices" , arXiv:1709.06686v1 [cs.DC], 2017, 17 pages.

Wang et al., "Batch-normalized deep neural networks for achieving fast intelligent fault diagnosis of machines" , Neurocomputing vol. 329, Feb. 15, 2019, pp. 53-65.

Yu et al., "Network Intrusion Detection through Stacking Dilated Convolutional Autoencoders" Nov. 16, 2017 Hindawi Security and Communication Networks vol. 2017, 10 pages.

\* cited by examiner

FIG. 7

CHARACTERIZING A COMPUTERIZED SYSTEM BASED ON CLUSTERS OF KEY PERFORMANCE INDICATORS

STATEMENT REGARDING PRIOR DISCLOSURES BY THE INVENTOR OR A JOINT INVENTOR

The document "Cloud Causality Analyzer for Anomaly Detection", Swiss Federal Institute of Technology Zurich, Master Thesis, was authored by Lili L. Georgieva, co-inventor of the present invention, and published on Apr. 14, 2021. This document was prepared under advisement of Mircea R. Gusat (also known as Mitch Gusat), co-inventor of the present invention.

BACKGROUND

The invention relates in general to the field of computer-implemented methods, characterization systems, and computer program products for characterizing computerized systems based on key performance indicators (KPIs). In particular, it is directed to methods that cluster KPIs for a computerized system, identify representative KPIs in each cluster, and feed values of the representative KPIs in input channels of a trained neural network to characterize the computerized system.

In recent years, explainability and causality have been the subject of increasing interest in the machine learning community. Given the proliferation of complex, black-box neural network models, many called for the need to explain model predictions and deepen the causal discovery of true causes of predicted outcomes. In particular, one important area in the cybersecurity and cloud computing domain is anomaly detection (AD), which relates to the identification of rare or unexpected events or data patterns in computerized systems. Beyond anomaly detection, it is often necessary to be able to aptly characterize such computerized systems. Various application- and data-specific statistical and deep learning models have been proposed for characterizing computerized systems, in particular for anomaly detection. Explainability methods generally fail to drill in deeper from causal inference of symptoms to root cause analysis (RCA)—inferring the faults that generated the observed symptoms—while baseline causality methods suffer from inefficiency and scalability issues when run on large datasets.

SUMMARY

According to a first aspect, the present invention is embodied as a computer-implemented method of characterizing a computerized system based on key performance indicators (KPIs), for the computerized system. The method comprises channeling the KPIs through n buffer channels, where n≥2. The KPIs are channeled by: accessing KPIs (each of the KPIs is a timeseries of KPI values); clustering the KPIs accessed to obtain k clusters (each cluster includes at least m KPIs, where m>n and k≥2); and, for each cluster of the k clusters obtained, identifying n representative KPIs in each cluster as objects of n respective types and buffering KPI values of the n representative KPIs identified in respective ones of the n buffer channels. The KPI values buffered in the n buffer channels are then fed into respective input channels of a trained neural network. The latter further comprises inner neural layers (i.e., hidden layers), which are connected by each of the n input channels. The neural network independently processes the KPIs in the input channels and produces output values in output of the inner layers. Eventually, the computerized system is characterized based on the output values produced, e.g., to detect an anomaly in the system.

In embodiments, the method further comprises troubleshooting the computerized system by performing a causal analysis based on a selection of the representatives KPIs, where the latter have been determined to contribute the most to the anomaly detected.

The proposed approach allows substantial compression to be achieved prior to feeding the KPIs into the neural network, compared with a systematic approach ingesting all the available KPIs. Note, this initial compression mechanism is implemented upstream of the additional compression that is likely performed by the neural network layers of the neural network. Still, the clustering approach makes it possible to preserve all important information, such that a meaningful characterization can still be performed in an unsupervised manner. Moreover, the cluster-based compression eases the task of support engineers when analyzing the system performance behavior, e.g., to resolve incidents.

In embodiments, the n representative KPIs identified for each cluster include a central KPI and a peripheral KPI of the KPIs in said each cluster. Preferably, n=2, such that the n buffer channels consists of two buffer channels only (a first buffer channel and a second buffer channel). Similarly, the input channels of the neural network consists of two input channels only (a first input channel and a second input channel). In that case, the two representative KPIs identified for each cluster consist of the central KPI and the peripheral KPI. Central KPIs of the k clusters are buffered in the first buffer channel and then fed into the first input channel, while peripheral KPIs of the k clusters are buffered in the first channel and then fed into the second input channel.

In embodiments, the KPIs are clustered thanks to similarity measurements performed for all pairs of the KPIs accessed. Each of the pairs involves a first KPI and a second KPI. The similarity measurements are performed based on a similarity measure that identifies, for each pair, a maximal value of normalized cross-correlation values. The latter are obtained by sliding the first KPI over the second KPI. The KPIs may for instance be iteratively clustered thanks to the so-called k-shape algorithm. Preferably, the normalized cross-correlation values are calculated using fast Fourier transformations and normalized by a geometric mean of autocorrelations of the first KPI and the second KPI.

According to another aspect, the invention is embodied as a characterization system for characterizing a computerized system based on KPIs. The characterization system comprises a communication unit configured to access data from the computerized system (i.e., data stored or conveyed in the computerized system of interest), as well as processing means connected to the communication unit and configured to perform steps according to any of the methods evoked above, i.e., channel the KPIs through n buffer channels (by clustering the KPIs and identifying representative KPIs in each cluster), feed KPI values of the representative KPIs into respective input channels of a trained neural network, and characterize the computerized system based on output values produced by the neural network.

According to a final aspect, the invention is embodied as a computer program product, which comprises a computer readable storage medium having program instructions embodied therewith, where the program instructions are executable by processing means to cause the latter to perform steps according to any of the methods evoked above.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

The accompanying drawings show simplified representations of devices or parts thereof, as involved in embodiments. Similar or functionally similar elements in the figures have been allocated the same numeral references, unless otherwise indicated.

Characterization systems, computer-implemented methods, and computer program products embodying the present invention will now be described, by way of non-limiting examples.

DETAILED DESCRIPTION OF EMBODIMENTS OF THE INVENTION

The following description is structured as follows. First, general embodiments and high-level variants are described in section 1. Section 2 addresses particularly preferred embodiments. Section 3 concerns technical implementation details. Note, the present method and its variants are collectively referred to as the "present methods". All references Sn refer to methods steps (FIGS. 2, 3, and 4), while numeral references pertain to physical parts, components, and concepts involved in the present characterization systems (FIGS. 1, 4, 5, and 6).

1. General Embodiments and High-Level Variants

In reference to FIGS. 1-5, and 7, a first aspect of the invention is now described in detail. This aspect concerns a computer-implemented method of characterizing a computerized system 2 (see FIG. 1) based on key performance indicators (KPIs) for the computerized system 2. The KPIs are typically obtained from compute devices and/or storage devices composing the system 2.

The method comprises channeling selected KPIs through n buffer channels, where n≥2. Each buffer channel is basically a memory for temporarily storing values of the KPIs. I.e., the buffer channels store KPIs with a view to subsequently injecting the stored KPI values in input channels of a cognitive model 15, in order to characterize the system 2 based on outputs of the model 15.

Figure 2:
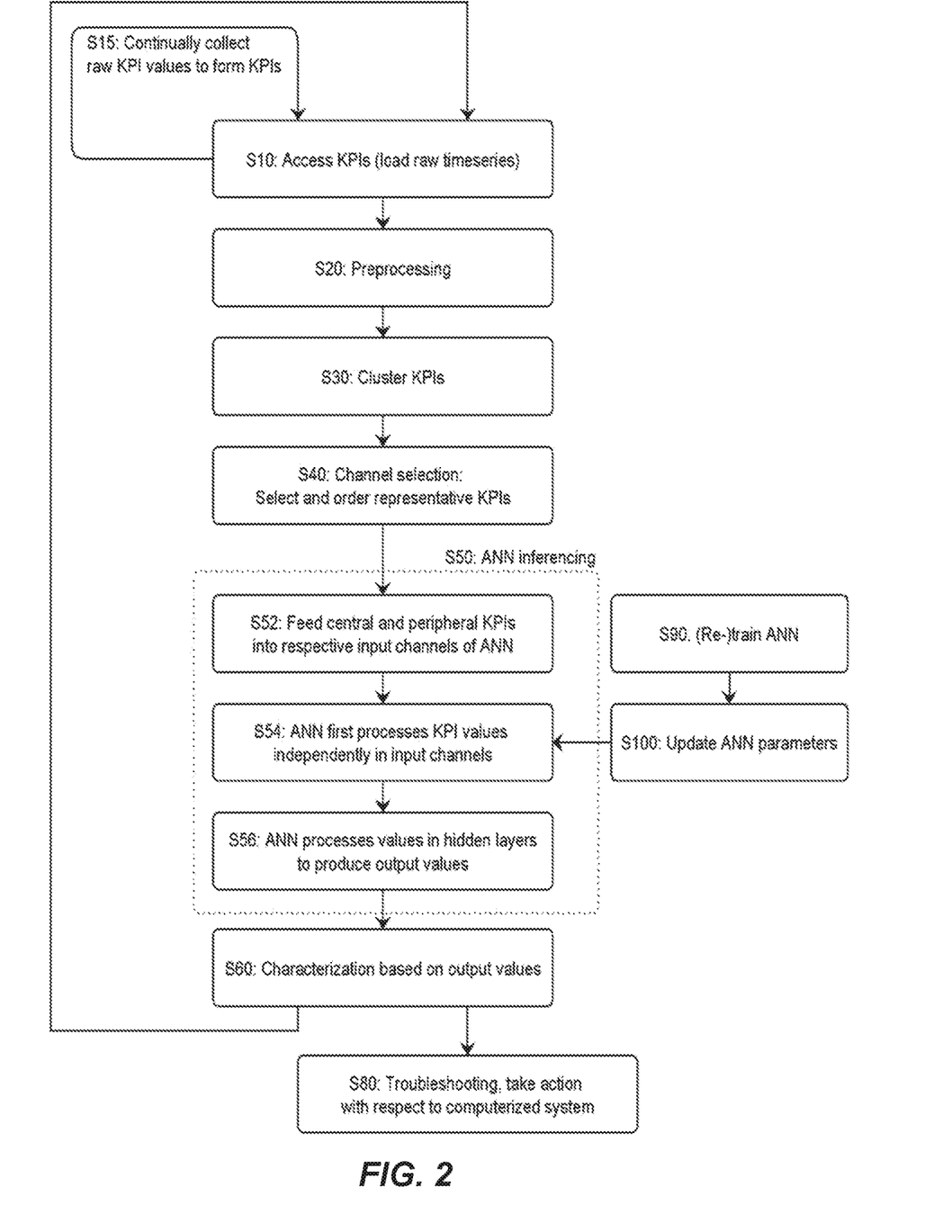
FIGS. 2 and 3 are flowchart illustrating high-level steps of a method of characterizing a computerized system, according to embodiments.
Figure 3:
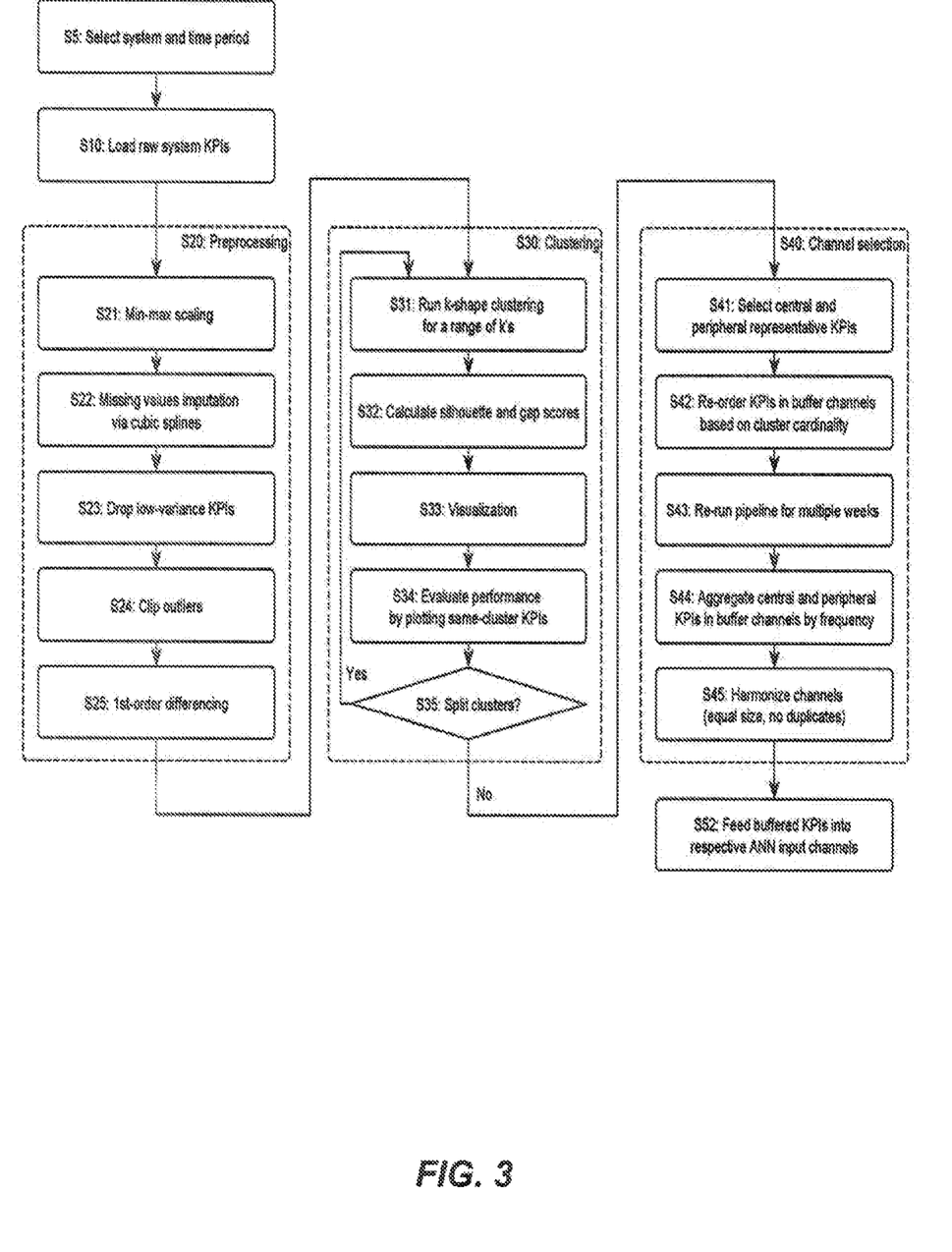
Figure 4:
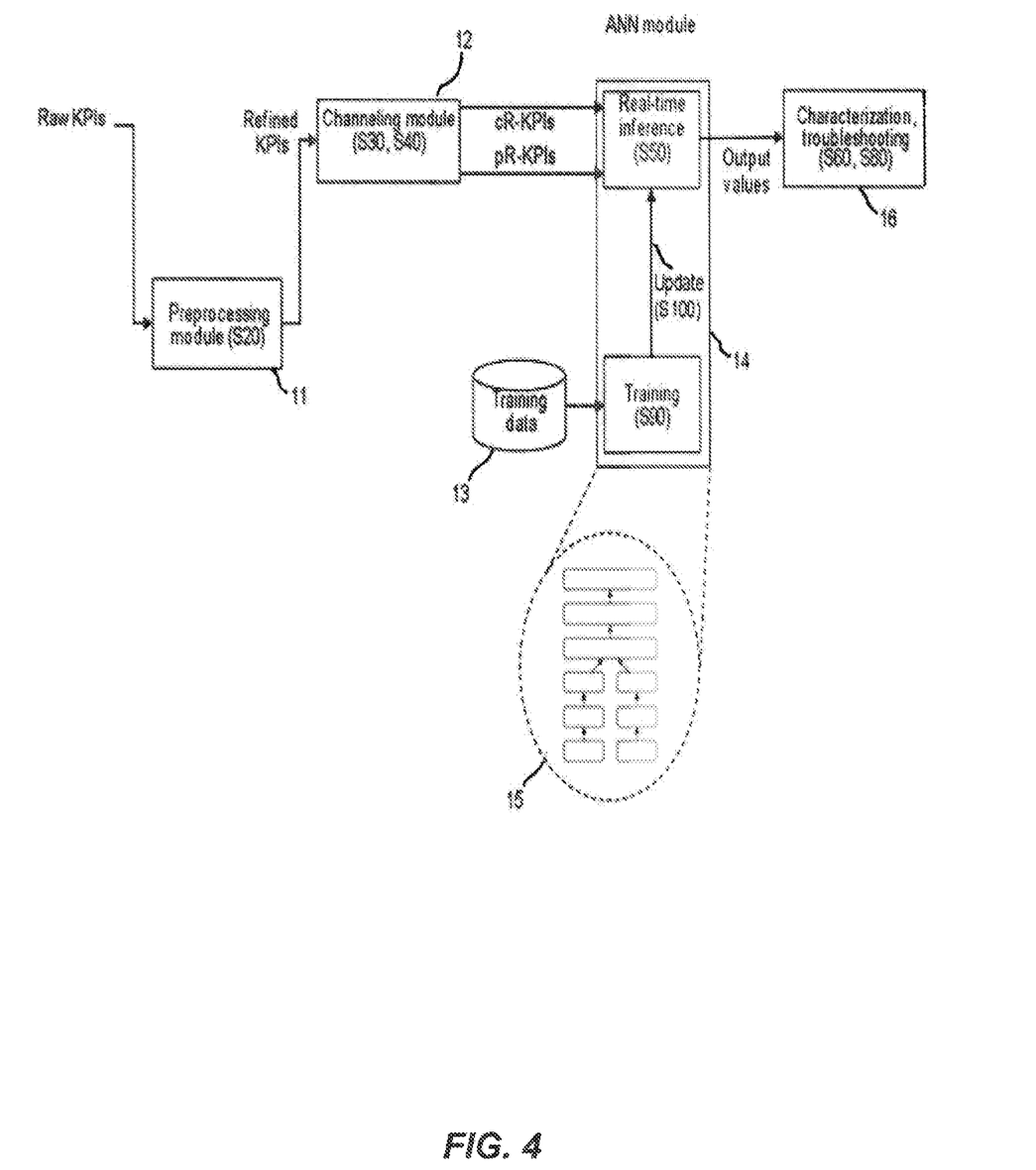
FIG. 4 is a block diagram illustrating selected components of and tasks performed by this characterization system, as in embodiments. The characterization system may notably be embodied as a general-purpose computerized system such as depicted in FIG. 6.
Figure 7:
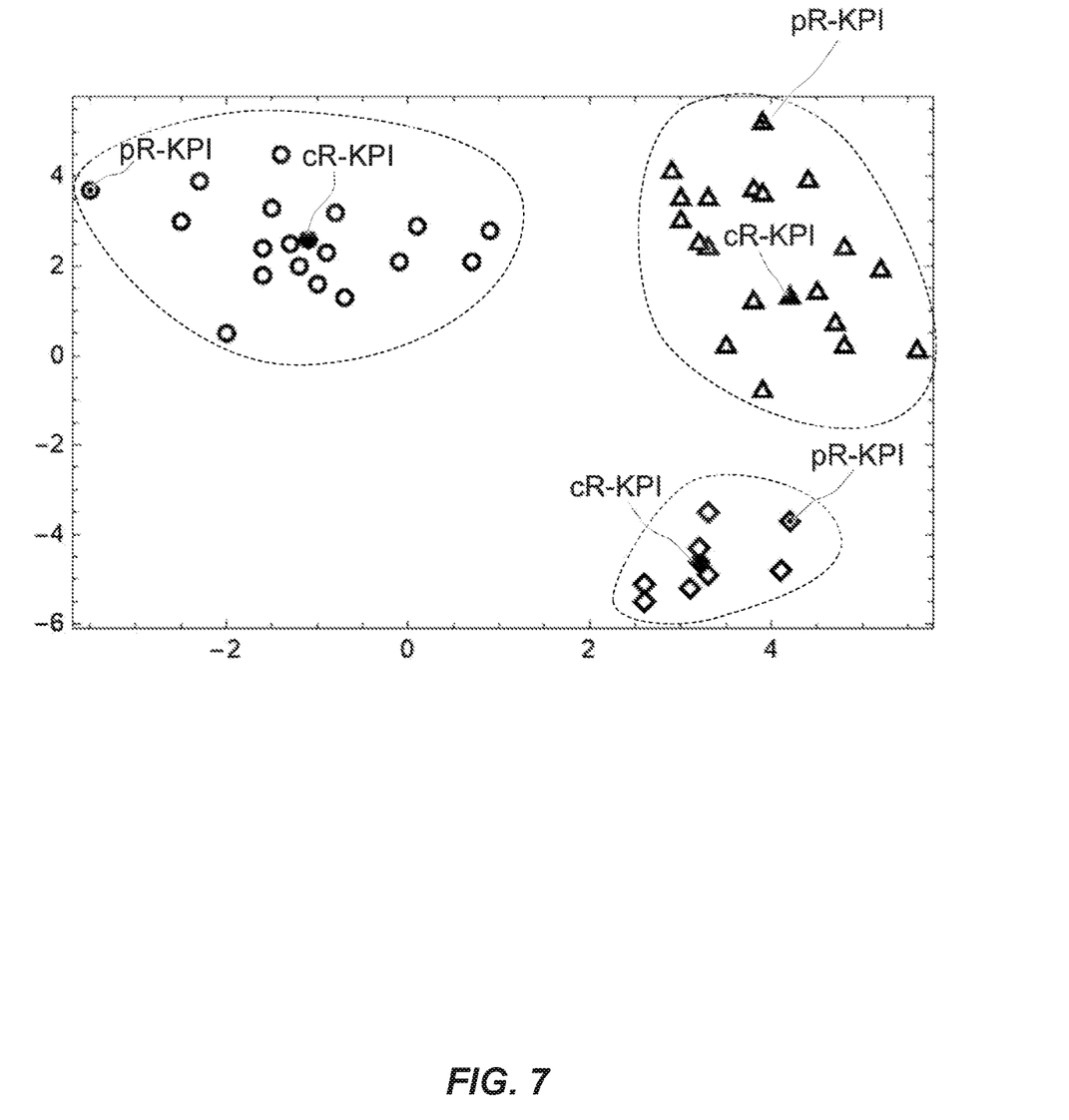
FIG. 7 is a graph illustrating how the clustering of key performance indicators and the identification of representatives of these clusters to reduce the number of KPIs to be processed to characterize the computerized system, as in embodiments.

Steps S10 to S40 in FIGS. 2, 3, and 4, illustrate an example of such a channeling process. Most generally, KPIs are channeled as follows. KPIs are accessed at step S10. Each KPI is a timeseries, i.e., a series of values (here called KPI values) of a quantity obtained at successive times. Such KPI values may for instance be continuously collected and aggregated S15 from data streams of raw KPI values. The aggregated values need typically be preprocessed S20, as discussed later in reference to particular embodiments. The accessed KPIs are then clustered at step S30. This way, k clusters are obtained, where k≥2, as illustrated in FIG. 7 (k=3 in this simple example). Note, the clusters are projected in a 2D space in FIG. 7, for the sake of depiction. However, it will be clear to the skilled person that the dimensions of the KPIs are typically much larger. Each cluster includes at least m KPIs, where m>n. That is, each cluster should include a number m of KPIs that is larger than the number n of input channels, for reasons that will become apparent later. Finally, representative KPIs are identified in each cluster formed. That is, for each cluster of the k clusters obtained thanks to the clustering process, n representative KPIs are identified S41 in each cluster. The representative KPIs are identified S41 as objects of distinct types. I.e., n representative KPIs are identified S41 as objects of n respective types. KPI values of the n representative KPIs identified are then buffered S44 in respective channels of the n buffer channels.

Figure 5:
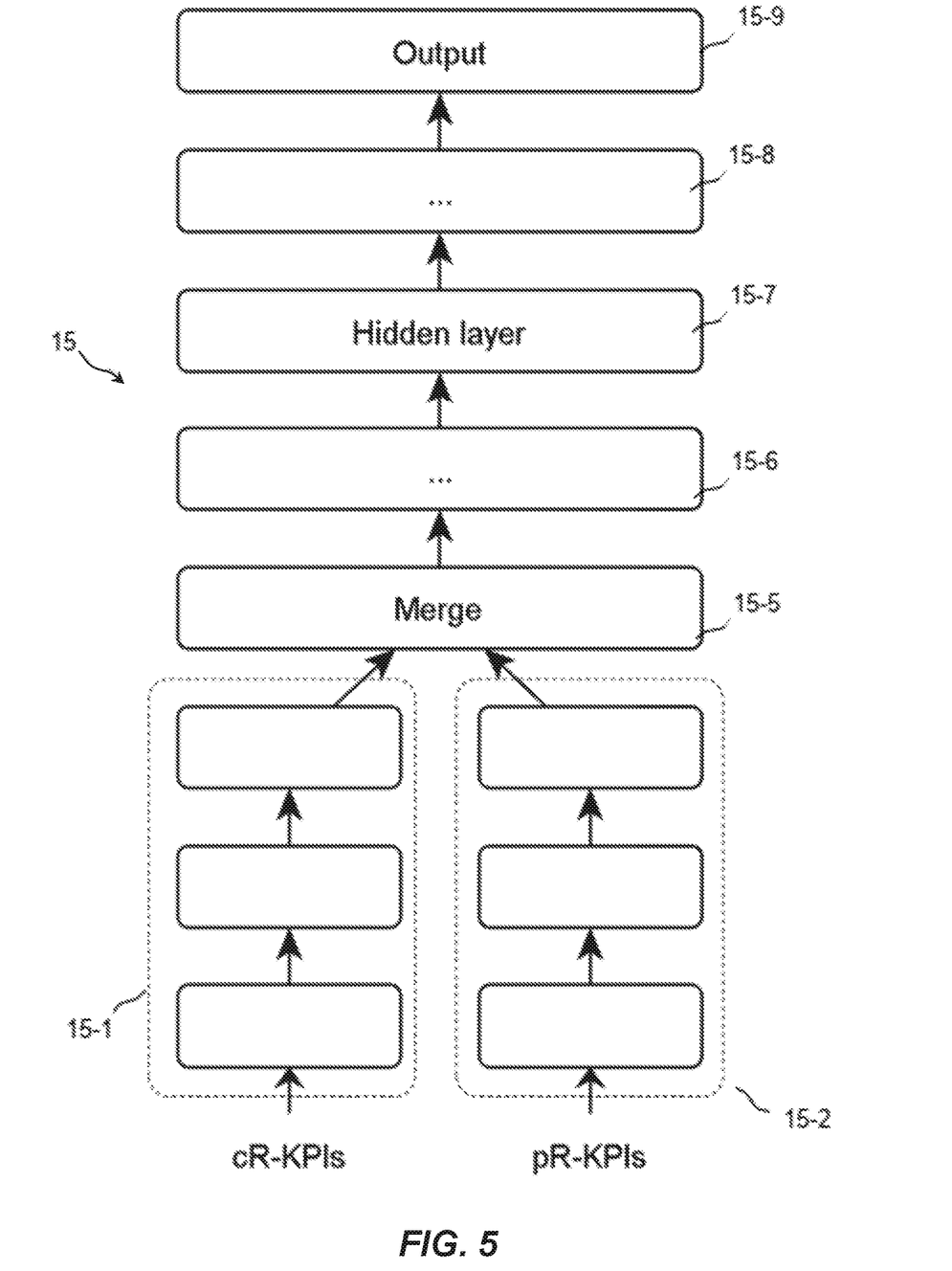
FIG. 5 schematically depicts artificial neuron layers of a neural network with two input channels, as involved in embodiments.

Next, the KPI values (as buffered in the n buffer channels) are fed S52 into respective input channels 15-1, 15-2 of a trained neural network 15. That is, the neural network 15 includes n input channels, which typically form n respective sets of independent neural layers. I.e., each input channel includes a set of layers that are independent of layers of the other input channels. An example of a structure of such a neural network 15 is shown in FIG. 5. In addition to the n input channels 15-1, 15-2, the neural network 15 includes inner neural layers, i.e., hidden layer that are connected by each of the n input channels 15-1, 15-2. More precisely, the first layer of the inner neural layers (call it a junction neural layer 15-5, e.g., embodied as an attention layer), is connected by each of the independent input channels 15-1, 15-2. Such a neural network 15 can separately process the KPIs fed in the n input channels, prior to jointly processing the values in the inner layers 15-5, 15-6, 15-7, 15-8, and 15-9, and then producing output values in output of the inner layers 15-6-15-9. More precisely, output values are produced by an output layer 15-9.

To summarize, feeding the KPI values to the n input channels causes the neural network 15 to independently process S54 the KPIs in the input channels and produce S56 output values in output of the inner layers 15-6-15-9. Eventually, the computerized system 2 is characterized S60 based on the output values produced by the neural network, e.g., to detect an anomaly in the system and, if necessary, to troubleshoot the system, as in embodiments described later in detail.

The proposed approach allows substantial compression to be achieved prior to feeding KPIs into the cognitive model 15. The compression performance is markedly improved compared with a systematic approach ingesting all the available KPIs. Note, this initial compression mechanism is implemented upstream of the additional compression that is likely performed by the neural network layers of the model 15. Still, the clustering approach makes it possible to preserve all important information, such that a meaningful characterization can still be performed in an unsupervised manner. Moreover, the cluster-based compression eases the task of support engineers when analyzing the system performance behavior, e.g., to resolve incidents, for reasons explained later.

The present approach may for instance be used to monitor general-purpose computers, datacenters, clouds, supercomputers, as well as memory and storage hardware, and load/store engines.

Comments are in order. To start with, the data aggregation and clustering steps can be performed repeatedly, so as to continually feed the cognitive model 15 with data and continually characterize the system 2 of interest, possibly in near real-time. Thus, the buffered KPIs can be continually fed into respective input channels of the cognitive model. For example, the above method may be implemented as an anomaly detection method to detect potential anomalies, in near real-time. However, this method may also be performed on specific occasions, e.g., in respect of past timeseries, to detect past anomalies in the system 2 (e.g., for forensic purposes), as support engineers may do to investigate anomalies on request of users.

The range of KPIs considered for clustering may typically include between 50 and 260 KPIs. However, one will preferably seek to ingest between 70 and 130 KPIs in practice, e.g., approximately 100 KPIs. Some of the initial KPIs may possibly be discarded, after some preprocessing S20, as later discussed in reference to FIG. 3. The KPIs are computed based on data collected (e.g., streamed) from the computerized system 2 of interest. The KPIs may be formed using any suitable metric. Such KPIs may for instance relate to CPU utilizations, read/write response times, and read/write input/output (I/O) rates. Other KPIs may for instance relate to access rights, disk-to-cache transfer rates or, conversely, cache-to-disk transfer rates, possibly using volume cache (VC) or volume copy cache (VCC) metrics for volumes. In practice, however, cache-related KPIs are found to be less useful than read/write data in the present context. Other types of KPIs are known to the skilled person.

The KPIs may be streamed and sampled at any suitable frequency, e.g., 288 times per day, i.e., every 300 seconds (every 5 minutes). Such a frequency happens to be a practical upper bound of common long short-term memory (LSTM), gated recurrent units (GRUs), and recurrent neural network (RNN) memories. The sampling frequency determines the number of data points per time unit (e.g., per day). Still, a more significant constraint for running LSTMs, GRUs, etc., is the duration of the period used to train the model, e.g., 1, 3, or 6 months. Higher frequencies and/or longer periods may require a special mechanism, such as a skip mechanism, an attention mechanism, and/or temporal convolutional network (TCN) or dilated convolutional neural network (CNN) layers.

The KPIs are formed as timeseries, i.e., as objects of the form $\{ \ldots, x_{1, t-2}, x_{1, t1}, x_{1, t} \}, \ldots, \{ \ldots, x_{n, t-2}, x_{n, t-1}, x_{n, t} \}\}$, where $\{ \ldots, x_{1, t-2}, x_{1, t-1}, x_{1, t} \}$ denote values obtained at distinct time points for a same KPI $x_1$, while $x_1, \ldots, x_n$ denote distinct KPIs. As noted above, the timeseries can be aggregated based on data collected at regular time intervals from the system 2. The collected data may possibly be up/sub-sampled, in order to form the timeseries. E.g., one may possibly need to interpolate and/or extrapolate the timeseries for the timeseries values of the various KPIs to correspond to same time points, as in preferred embodiments. In that case, the input array considered for clustering may be of the form $\{\{t_1, t_2, \ldots, t_m\}, \{x_{11}, x_{12}, \ldots, x_{1m}\}, \{x_{21}, x_{22}, \ldots, x_{2m}\}, \ldots, \{x_{k1}, x_{k2}, \ldots, x_{km}\}\}$. Still, the clustering algorithm preferably operates based on the sole KPI values $\{\{x_{11}, x_{12}, \ldots, x_{1m}\}, \{x_{21}, x_{22}, \ldots, x_{2m}\}, \ldots, \{x_{k1}, x_{k2}, \ldots, x_{km}\}\}$, while the time-related data can be stored for later use.

As seen in FIG. 7, the representative KPIs (R-KPIs) are typical examples of KPIs of a given cluster. Such examples, taken as a whole, provide a synthetic description of the cluster, i.e., they represent that cluster well. Representative KPIs can be identified thanks to a suitable metric, e.g., the same distance or similarity metric as used to identify the clusters. In each cluster, the n representative KPIs are identified as objects of n respective types, i.e., as objects having different properties as per the metric used to identify them.

The representative KPIs are preferably identified so as to exhibit antagonistic or contrasting properties, as per the metric used to identify them. Preferred is to select a central KPI and a peripheral KPI in each cluster. That is, the n representative KPIs identified S41 in each cluster may include a central KPI (cR-KPI) and a peripheral KPI (pR-KPI) of this cluster, e.g., the most central and the most peripheral KPIs, as assumed in FIG. 7. For example, the KPIs can be ordered in each cluster according to their distances to the centroid of the cluster, which makes it possible to easily determine such KPIs. Preferably, use is made of the most central KPI and the most peripheral KPI only, such that only two buffer channels and two inputs channels are needed in that case. The most central and the most peripheral KPIs can be regarded as statistically normal and abnormal KPIs, respectively.

In variants, one may select different types of KPIs (i.e., other than the central and peripheral KPIs), provided that the KPIs selected remain sufficiently representative of each cluster. For example, the representative KPIs may be selected as follows. In each cluster, one first selects a subset of n KPIs that are the closest to the average radial distance to the centroid. In that sense, the n KPIs selected are representative of this cluster. Then, one categorize the n KPIs selected into n different types, in accordance with their respective distances to n axes spanning a n-dimensional space, where the n axes may for instance be determined by principal component analysis. Other algorithms may similarly be designed, to select n representative KPIs in each cluster.

Next, the algorithm can for example aggregate timeseries corresponding to representative KPIs of each type. I.e., representative KPIs of a given type form a set , $\{\{x_{j1}, x_{j2}, \ldots, x_{jm}\}, \{x_{k1}, x_{k2}, \ldots, x_{km}\}, \ldots \}$, where $\{x_{j1}, x_{j2}, \ldots, x_{jm}\}$ corresponds to one representative KPI of that given type. The corresponding KPIs are then fed into a respective input channel of the neural network 15. In other words, n-uplets of KPIs are identified, and the KPIs of each n-uplet is subsequently fed into the $n^{th}$ input channel of the cognitive model 15. As noted earlier, time data do typically not need to be fed into the model, because they do not provide learnable information. However, they are typically saved, in order to later map detected anomalous indices to time points, e.g., when investigating incidents.

In principle, one may have any number n of input channels, provided that this number is smaller than the average number of KPIs in each cluster. That is, if k clusters of KPIs are identified, which, on average, include M KPIs, then n must be strictly smaller than M. To that aim, one may need to adapt the number k of clusters formed to ensure that a sufficiently large number of KPIs are included in each cluster. That said, the number n of channels is preferably chosen to be small, to increase the compression achieved through the clustering and selection process.

The number n of channels is preferably chosen to be equal to 2. In that case, the two representative KPIs identified S41 for each cluster may correspond to the most central KPI (cR-KPI) and the most peripheral KPI (pR-KPI) in this cluster, as assumed in FIG. 7. Choosing n=2 means that the buffer channels consists of two buffer channels only, namely a first buffer channel and a second buffer channel. Similarly, the input channels of the neural network 15 consists of two input channels 15-1, 15-2 only, i.e., a first input channel 15-1 and a second input channel 15-2, as assumed in FIG. 5. Thus, the central KPIs of the k clusters can be buffered S44 in the first buffer channel and fed S52 into the first input channel 15-1, while peripheral KPIs of the k clusters are buffered S44 in the first channel and fed S52 into the second input channel 15-2.

For example, two data streams of representative KPIs (central and peripheral KPIS) can be formed, from which two compressed channels (the buffer channels) are built, which are later ingested by the cognitive model 15. In addition, a frequency-based aggregation mechanism can be used, whereby the most frequently occurring KPIs are selected, e.g., according to a percentage or heuristic. The aggregation mechanism may for instance aggregate the most frequently, weekly representative KPIs occurring in one month into monthly KPI channels. Applying this to both the central- and peripheral-representative KPIs yields two monthly channels. Still, the channeling algorithm may ensure that both channels are equally-sized, according to a predefined channel size (e.g., specified by a user). This makes it possible to achieve balance between capturing: (i) the current representative trends, and (ii) the core system behavior during an extended time period. For example, each KPI may be a vector aggregating one week of data (2016 points), corresponding to 5 min time lags. The same procedure can be run for several successive weeks; the most frequent KPIs are then picked up to extract monthly representatives.

In addition, the clusters are preferably ordered by cardinality, prior to feeding S52 the buffered KPIs into the input channels. More precisely, the KPIs (as buffered in each of the two buffer channels) may be ordered (see step S42 in FIG. 3) in descending order of cardinality of the respective clusters. In other words, the representative KPIs of large clusters are buffered first. In practice, the ingestion tensor may be built cluster-by-cluster, from the largest to the smallest cluster by cardinality number of KPIs in each cluster. That is, one may first sort the clusters by cardinality, then sort and select the KPIs according to their distances to the centroids of the clusters, to select the representative KPIs (contrary to the flow assumed in FIG. 3). The benefit of such an ordering on the model performance can be evaluated at run-time.

The KPIs can be clustered S30 thanks to any suitable distance or similarity metric. In embodiments, the KPIs are clustered S30 thanks to similarity measurements performed for all pairs of the KPIs accessed. For example, the similarity measurements can be performed based on a similarity measure that identifies, for each pair of KPIs, a maximal value of cross-correlation. This value can notably be determined based on normalized cross-correlation (NCC) values obtained by sliding the first KPI over the second KPI, for each pair of KPIs. The NCC values are preferably calculated using fast Fourier transformations and then normalized by the geometric mean of the autocorrelations of the first KPI and the second KPI (for each pair). Note, the above similarity measure may equivalently be expressed as a distance.

In preferred embodiments, the KPIs are iteratively clustered S30 thanks to a k-shape algorithm. The k-shape clustering algorithm is a robust, iterative refinement algorithm that scales linearly with the number of features and creates k-well-separated, homogeneous clusters. This clustering process is iterative: the algorithm first randomly initializes the timeseries' assignments to clusters and then iteratively updates the assignments based on distances to the cluster centroids. In practice, one preferably seeks to obtain 8 to 10 clusters, eventually. This clustering algorithm relies on the so-called shape-based distance (SBD), which uses an NCC measure that compares the shapes of the timeseries shapes and hence can detect pairwise similarities, even for lagged (non-simultaneous) co-dependencies.

In detail, given two timeseries vectors x and y, the SBB distance is computed by sliding x over y in the position w that offers the maximal, normalized cross-correlation $NCC_w$(x, y). This distance can be expressed as $SBD(x, y) = 1 - \max_w (NCC_w(x, y))$. As noted earlier, $NCC_w(x, y)$ can be calculated by means of Fast Fourier Transformations and normalized by the geometric mean of the auto-correlations of x and y. The k-shape clustering algorithm is preferably used on normalized, preprocessed KPIs, to enhance performance with respect to raw KPIs. As defined above, the k-shape clustering algorithm scales linearly with the number of KPIs. Still, the KPIs may also be clustered based on another suitable distance or similarity metric.

As indicated earlier, the representative KPIs are preferably re-ordered, prior to be fed into the n input channels. That is, the representative KPIs can be ordered in the buffer channels to have stronger adjacency when ingested in the cognitive model 15. Various approaches can be contemplated. For example, the KPIs can be sorted in each cluster, based on their SBD-distance to the respective centroid—in ascending order for the central channel and descending order for the peripheral channel. Then, the ingestion tensor is built cluster-by-cluster, starting from the largest to the smallest cluster by cardinality number of KPIs. Combining the k-shape clustering algorithm with a two-channel extraction (for central and peripheral representative KPIs) allows a particularly efficient compression to be achieved.

The characterization S60 of the computerized system 2 may notably aim at detecting a potential anomaly, based on the output values produced by the cognitive model 15. For example, the values produced in output of the model 15 may be converted into an anomaly score indicative of whether an anomaly occurs (or occurred) in the system 2. Formally, anomalies are defined as rare events that are so different from other observations that they raise suspicion concerning the mechanism that generated them. Anomalies may arise due to malicious or improper actions, frauds, or system failures, for example. Such anomalies may notably lead to a data traffic anomaly, as with network attacks (e.g., on the business environment), unauthorized accesses, network intrusions, improper data disclosures, data leakages, system malfunctions, or data and/or resources deletion, etc. Anomaly detection is important in various domains, such as cybersecurity, fraud detection, and healthcare. An early detection is of utmost importance as failing to act upon them can cause significant harm.

The detection of an anomaly may lead to (instruct to) take S80 action in respect of the computerized system 2, so as to modify a functioning of the computerized system. Any appropriate decision may be made in the interest of preserving the system and/or its environment. Both the type of action and its intensity may depend on the anomaly score obtained. For example, a preemptive action may be taken, to preempt or forestall adverse phenomena. E.g., in case a substantial anomaly is detected, some of the data traffic may be interrupted, re-routed, deleted, or even selected parts of the computerized system may be shut down, as necessary to deal with the anomaly detected.

The detection of an anomaly may notably lead to troubleshooting S80 the computerized system 2, e.g., by performing a causal analysis based on a selection of the representatives KPIs that have been determined to contribute the most to the anomaly detected. In that respect, reducing the feature space to only a small number of KPIs (as achieved thanks to the proposed pre-compression scheme) allows support engineers to analyze the system performance behavior more effectively, based on only a fraction of the vast amounts of initial KPIs, and accordingly reduces incident resolution times. Moreover, the proposed feature compression is crucial for scalable causality discovery of root anomalous culprits.

Preferred embodiments of the cognitive model 15 are now discussed in detail. To start with, the n input channels 15-1, 15-2 of the neural network 15 are preferably formed by n respective sets of neural layers. Thus, in operation, the neural network 15 independently processes S56 the KPIs in the n input channels via the n respective sets of neural layers. The inner layers 15-6-15-9 (i.e., hidden layers) may notably include one or more CNN layers and/or one or more RNN layers. In particularly preferred embodiments, the inner layers 15-6-15-9 are configured as an autoencoder (AE), i.e., a set of neural network layers configured as an encoder branching to another set of neural network layers configured as a decoder. The encoder compresses input data into a latent space manifold, which encodes the essential signal, and then feeds this into the decoder, which attempts to reconstruct the input from the compressed representation. A preferred architecture is one that is based on a convolutional autoencoder, consisting of a core CNN to manage the KPIs' spatial order (but having shallow memory) and a temporal RNN. More precisely, the encoder can be designed as a temporal convolutional network (TCN), ensuring performance, flexibility, and potential for expanded scope causal discovery. Still, other network architectures can be contemplated.

The following explains how KPIs are preferably obtained and pre-processed. Raw KPI values can for instance be aggregated based on data streams of data collected from the computerized system 2, to form the KPIs as timeseries, prior to clustering S30 them. As suggested in FIG. 2, raw KPI values may for instance be continually collected S15 from data streams, e.g., by sampling data from data flows in data communication and/or control channels. The collected values are then buffered with a view to preprocessing S20 them and then clustering S30 them. Use is preferably made of a preprocessing pipeline such as shown in FIG. 3. Refined versions of the raw KPI values are obtained, which are subsequently clustered at step S30. The preprocessing step S20 may notably include rescaling S21 each of the KPIs to a same range of values. KPI values may notably be rescaled according to a min-max scaling (also known as min-max normalization), e.g., to the range [0, 1]. Rescaling KPI values to a same range markedly improve the results, notably for anomaly detection. If necessary, the preprocessing pipeline may include an imputation S22 of missing KPI values. Conversely, some KPI values may possibly be discarded. For example, low-variance KPIs may be dropped S23 (i.e., KPIs that have a variance that is less than a predefined threshold). Moreover, KPIs that include outlier KPI values can optionally be clipped S24. Trends are preferably removed S25 too, e.g., thanks to a first-order differencing, to further improve anomaly detections. The differencing may for instance be performed based on results from an Augmented Dickey-Fuller stationarity test.

Figure 1:
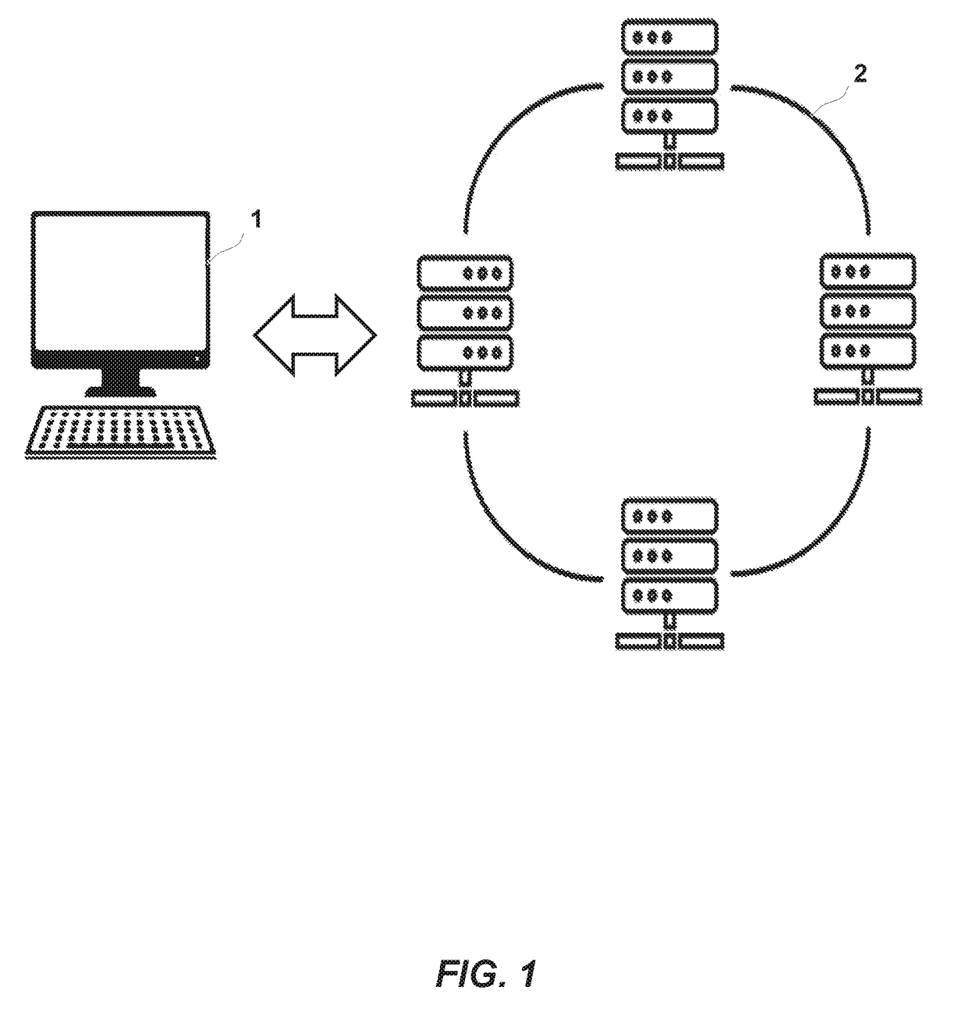
FIG. 1 schematically illustrates a characterization system interacting with a computerized system of interest, as in embodiments.
Figure 6:
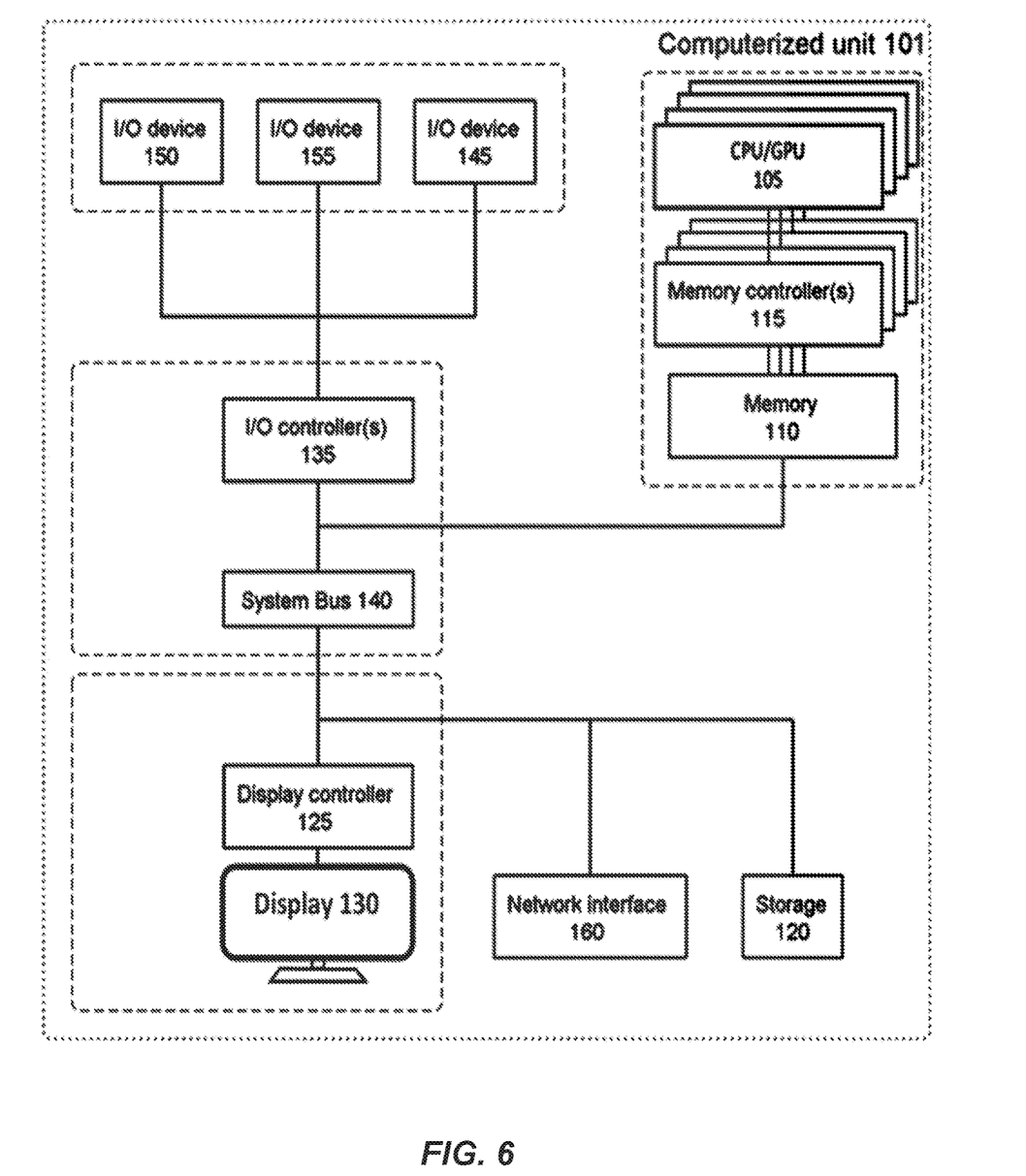

Another aspect of the invention is now discussed in reference to FIGS. 1, 4, and 6. This aspect concerns a characterization system 1 for characterizing a computerized system 2, as schematically illustrated in FIG. 1. Consistently with the present methods, characterizations are performed based on KPIs for the computerized system 2. As noted earlier, the computerized system 2 may notably be a single computer or a network of interconnected computerized units 25, e.g., forming a cloud computing system. In that case, the nodes 25 may store and deploy resources, so as to provide cloud services for users, which may include companies or other large infrastructures. Note, the characterization system 1 may possibly belong to the target computerized system 2 and include one or more units of that system 2.

In general, the characterization system 1 may include one or more computerized units 101 such as shown in FIG. 6. In the following, we assume that the system 1 consists of a single unit 101, for simplicity. The system 1 notably comprises a communication unit, which is configured to access data from the computerized system 2. The communication unit may for example be formed by a network interface 160 and an input/output (I/O) controller 135; the network interface 160 is connected to the I/O controller 135 via the system bus of the unit 101. The network interface 160 allows the characterization system 1 to receive external data, including data from the computerized system 2; the received data are then handled by the I/O controller.

The system 1 further comprises processing means 105, which are connected to the communication unit. The system 1 typically includes computerized methods in the form of software that is stored in a storage 120. The software instructions can be loaded in the memory 110, so as to configure the processing means 105 to perform steps according to the present methods. This way, the processing means will, in operation, cause to channel S10-S40 the KPIs through n buffer channels, by accessing S10 the KPIs, clustering S30 the KPIs accessed, identifying S41 representative KPIs in each cluster, and buffering S44 KPI values of the representative KPIs identified in buffer channels. In turn, the processing means 105 will cause to feed the buffered KPI values into input channels 15-1, 15-2 of a trained neural network 15, for the latter to produce S56 output values, based on which the processing means 105 characterize the computerized system 2, as explained earlier in reference to the present methods.

In particular, the input channels 15-1, 15-2 of the neural network 15 may be formed by respective sets of neural layers, for the neural network 15 to independently process S56 the KPIs in the input channels via the respective sets of neural layers. In addition, inner layers 15-6-15-9 of the neural network 15 may include one or more CNN and/or RNN layers. In particularly preferred embodiments, the neural network 15 relies on two input channels 15-1, 15-2 only, as discussed earlier. Additional features of the system 1 are described in section 3.1.

In the example of FIG. 1, the system 1 is assumed to be distinct from (nodes of) the system 2. That is, the system 1 is adapted to interact with hardware components of the system 2, e.g., with a view to detecting anomalies in this system 2 and instruct to take appropriate actions in respect of the target system 2. In variants, the system 1 may actually form part of the target system 2. In that case, the tasks performed by the characterization system 1 may for instance be delocalized over nodes of the system 2. Other entities (not shown) may possibly be involved, such as traffic monitoring entities (packet analyzers, etc.), with a view to extracting data to be fed into the neural network 15.

Next, according to a final aspect, the invention can be embodied as a computer program product for characterizing a computerized system 2. The computer program product comprises a computer readable storage medium having program instructions embodied therewith. Such instructions typically form a software, e.g., stored in the storage 120 of the system 1 described above. The program instructions can be executed by processing means 105 of such a system 1 to cause the latter to perform steps according to the present methods. Additional features of this computer program product are described in section 3.

The above embodiments have been succinctly described in reference to the accompanying drawings and may accommodate a number of variants. Several combinations of the above features may be contemplated. Examples are given in the next section.

2. Particularly Preferred Embodiments 2.1 Preferred Flows of Operations

FIG. 2 shows a high-level flow of operations according to preferred embodiments. Raw KPI values are continually collected S15 with a view to forming KPIs as timeseries. Raw KPI values are recurrently accessed S10 and then preprocessed S20, prior to clustering S30 the corresponding KPIs. In each of the clusters formed, representative KPIs (central and peripheral KPIs) are then selected, queued, and ordered S40 in respective buffer channels. The buffered KPIs are then injected in respective input channels of the artificial neural network (ANN) 15 to perform S50 inferences. I.e., the central and peripheral KPIs are fed S52 into respective input channels of the ANN, which independently processes S54 the injected KPI values in each input channel, prior to jointly processing S56 the resulting values in inner layers, to finally produce output values. The latter are subsequently used to characterize the target system 2, e.g., to detect a potential anomaly. This, in turn, may lead to troubleshoot S80 the system 2 or, more generally, take any action with respect to system 2, e.g., to modify and improve its functioning. Meanwhile, the ANN 15 may be retrained S90, e.g., as necessary to cope with dynamically evolving conditions. This causes to update S100 parameters (e.g., weights) of the ANN 15, which impacts subsequent inferences S50, and so on.

FIG. 4 shows a corresponding diagram. A preprocessing module 11 continually collects S15 raw KPI values. The latter are recurrently accessed S10 and preprocessed S20 to form timeseries. The refined KPI values are then clustered S30, and representative KPIs are channeled S40 via another module 12, prior to injecting them into an ANN module 14. I.e., representative KPIs are coupled into input channels of the ANN 15, to perform S50 inferences. Values produced in output of the ANN module 14 are then exploited by a further module 16 to characterize S60 and, if necessary, troubleshoot S80 the system 2. Meanwhile, training data may be continually updated and stored in a dedicated storage 13, with a view to continually retraining the ANN 15 and updating parameters thereof.

FIG. 3 provides more details about steps S20, S30, and S40, which relate to the preprocessing S20, clustering S30, and channel selection S40, respectively. Several target systems 2 may possibly be concurrently monitored. Thus, one may first select a given system 2 and a time period of interest at step S5, prior to loading S10 raw system KPI values for the system and time period selected.

The loaded KPI values are then preprocessed S20 via a preprocessing pipeline. Various preprocessing techniques may be contemplated, depending on the data types and applications. FIG. 3 shows a preferred preprocessing flow. The KPIs accessed S10 are first rescaled S21 to the range [0, 1] according to a min-max method. Missing values are imputed at step S22 using cubic splines. KPIs with lowest variance are subsequently dropped S23, while KPIs with extreme outliers are clipped S24, and the trends of the KPIs are removed S25 by differencing, if necessary.

Then, the KPIs are clustered at step S30. Namely, a k-shape clustering algorithm is run S31 for a range of k's. Silhouette and gap scores are calculated at step S32. Then, the clusters are visualized S33, e.g., using a t-distributed stochastic neighbor embedding (t-SNE) method and/or a Uniform Manifold Approximation and Projection (UMAP) method, resulting in so-called elbow plots, which depict the clusters in a lower-dimensional space. The performance of the clustering is evaluated S34 by plotting same-cluster KPIs. At step S35, a user may decide to further split the clusters. In variants, this decision is made automatically, using any suitable heuristic. If it is decided to further split the cluster (S35: Yes), the process loops back to step S31.

Else, KPIs are channeled at step S40, which decomposes as follows. First, central and peripheral KPIs are selected at step S41, e.g., according to SBD distances to their respective cluster centroids. The selected KPI values are then re-ordered S42 according to cardinalities of the clusters. Note, the above pipeline can be re-run S43 for multiple days/weeks (e.g., to aggregate values for a given month). Next, the KPIs are aggregated S44 by frequency in respective (central and peripheral) buffer channels. Care is taken S45 to maintain channels of equal size, free of duplicates.

Eventually, the buffered KPIs are fed S52 into respective input channels of the ANN 15, for inferencing purposes.

3. Technical Implementation Details 3.1 Computerized Units

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, a partly-interactive, or a non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

For instance, each of the systems 1 and 2 shown in FIG. 1 may comprise one or more computerized units 101 (e.g., general- or specific-purpose computers), such as shown in FIG. 6. Each unit 101 may interact with other, typically similar units 101, to perform steps according to the present methods.

In exemplary embodiments, in terms of hardware architecture, as shown in FIG. 6, each unit 101 includes at least one processor 105, and a memory 110 coupled to a memory controller 115. Several processors (CPUs, and/or GPUs)

may possibly be involved in each unit 101. To that aim, each CPU/GPU may be assigned a respective memory controller, as known per se.

One or more input and/or output (I/O) devices 145, 150, 155 (or peripherals) are communicatively coupled via a local input/output controller 135. The I/O controller 135 can be coupled to or include one or more buses and a system bus 140, as known in the art. The I/O controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 are hardware devices for executing software, including instructions such as coming as part of computerized tasks triggered by machine learning algorithms. The processors 105 can be any custom made or commercially available processor(s). In general, they may involve any type of semiconductor-based microprocessor (in the form of a microchip or chip set), or more generally any device for executing software instructions, including quantum processing devices.

The memory 110 typically includes volatile memory elements (e.g., random-access memory), and may further include nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 6, instructions loaded in the memory 110 may include instructions arising from the execution of the computerized methods described herein in accordance with exemplary embodiments. The memory 110 may further load a suitable operating system (OS) 111. The OS 111 essentially controls the execution of other computer programs or instructions and provides scheduling, I/O control, file and data management, memory management, and communication control and related services.

Possibly, a conventional keyboard and mouse can be coupled to the input/output controller 135. Other I/O devices 140-155 may be included. The computerized unit 101 can further include a display controller 125 coupled to a display 130. The computerized unit 101 may also include a network interface or transceiver 160 for coupling to a network (not shown), to enable, in turn, data communication to/from other, external components, e.g., other units 101.

The network transmits and receives data between a given unit 101 and other devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system and includes equipment for receiving and transmitting signals. Preferably though, this network should allow very fast message passing between the units.

The network can also be an IP-based network for communication between any given unit 101 and any external unit, via a broadband connection. In exemplary embodiments, network can be a managed IP network administered by a service provider. Besides, the network can be a packet-switched network such as a LAN, WAN, Internet network, an Internet of things network, etc.

3.2 Computer Program Products

The present invention may be a method, and/or a computer program product. The computer program product may include a computer readable storage medium (or media) having computer readable program instructions thereon for causing processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

3.3 Clouds

It is to be understood that although this disclosure refers to embodiments involving cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant, or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of characterizing a computerized system based on key performance indicators, or KPIs, for the computerized system, wherein the method comprises:

channeling the KPIs through n buffer channels, where n≥2, by
accessing KPIs, where each of the KPIs is a timeseries of KPI values,
clustering the KPIs accessed to obtain k clusters, each including at least m KPIs, where m>n and k≥2, and
for each cluster of the k clusters obtained, identifying n representative KPIs in said each cluster as objects of n respective types and buffering KPI values of the n representative KPIs identified in respective ones of the n buffer channels, feeding the KPI values buffered in the n buffer channels into respective input channels of a trained neural network, which further comprises inner neural layers connected by each of the n input channels, for the neural network to independently process the KPIs in the input channels and produce output values in output of the inner layers;

characterizing the computerized system based on the output values produced, characterizing the computerized system including detecting an anomaly in the computerized system based upon the output values produced; and troubleshooting the computerized system by performing a causal analysis based on a selection of the representatives KPIs that have been determined to contribute the most to the anomaly detected.

2. The method according to claim 1, wherein
the n representative KPIs identified for said each cluster include a central KPI and a peripheral KPI of the KPIs in said each cluster.

3. The method according to claim 2, wherein
n=2, such that the n buffer channels consists of two buffer channels only, these including a first buffer channel and a second buffer channel,
the input channels of the neural network consists of two input channels only, these including a first input channel and a second input channel, and
the two representative KPIs identified for said each cluster consist of said central KPI and said peripheral KPI, whereby central KPIs of the k clusters are buffered in the first buffer channel and fed into the first input channel, while peripheral KPIs of the k clusters are buffered in the first channel and fed into the second input channel.

4. The method according to claim 3, wherein
channeling the KPIs further comprises, prior to feeding the buffered KPIs into the n input channels, ordering the KPIs buffered in each of the two buffer channels in descending order of cardinality of respective ones of the k clusters.

5. The method according to claim 3, wherein
channeling the KPIs further comprises, prior to feeding the buffered KPIs, performing a selection of the KPIs that are most frequently occurring, so as to buffer KPI values of n representative KPIs of the most frequently occurring KPIs in said respective ones of the n buffer channels.

6. The method according to claim 1, wherein
the KPIs are clustered thanks to similarity measurements performed for all pairs of the KPIs accessed,
each pair of said pairs involves a first KPI and a second KPI, and
the similarity measurements are performed based on a similarity measure that identifies, for said each pair, a maximal value of normalized cross-correlation values obtained by sliding the first KPI over the second KPI.

7. The method according to claim 6, wherein
the normalized cross-correlation values are calculated using fast Fourier transformations and normalized by a geometric mean of autocorrelations of the first KPI and the second KPI.

8. The method according to claim 6, wherein
the KPIs are iteratively clustered by running a k-shape algorithm.

9. The method according to claim 1, wherein the method further comprises
instructing to take action in respect of the computerized system, based on the output values produced, so as to modify a functioning of the computerized system.

10. The method according to claim 1, wherein
the n input channels of the neural network are formed by n respective sets of neural layers, whereby the neural network independently processes the KPIs in the n input channels via the n respective sets of neural layers.

11. The method according to claim 10, wherein
the inner layers includes one or more convolutional neural network layers and/or one or more recurrent neural network layers.

12. The method according to claim 1, wherein
the method further comprises, prior to channeling the KPIs, aggregating raw KPI values based on data streams of data collected from the computerized system, to form said KPIs as timeseries.

13. The method according to claim 1, wherein
channeling the KPIs further comprises, after accessing the KPIs and prior to clustering the KPIs accessed, preprocessing the KPIs accessed according to a preprocessing pipeline to refine the KPI accessed, whereby refined versions of the KPIs are subsequently clustered to obtain the k clusters.

14. The method according to claim 13, wherein
preprocessing the KPIs accessed includes rescaling each of the KPIs accessed to a same range of values.

15. The method according to claim 13, wherein
preprocessing the KPIs accessed further comprises an imputation of missing KPI values in one or each of the accessed KPIs.

16. The method according to claim 13, wherein
preprocessing the KPIs accessed further comprises dropping one or more of the accessed KPIs that have a variance that is less than a predefined threshold.

17. The method according to claim 13, wherein
preprocessing the KPIs accessed further comprises clipping one or more of the accessed KPIs that include outlier KPI values.

18. The method according to claim 13, wherein
preprocessing the KPIs accessed further comprises removing a trend in one or more of the accessed KPIs, thanks to a first-order differencing.

19. A characterization system for characterizing a computerized system based on key performance indicators, or KPIs, for the computerized system, wherein the characterization system comprises:
a communication unit configured to access data from the computerized system; and
processing means connected to the communication unit and configured to
channel the KPIs through n buffer channels, where n≥2, by accessing KPIs, where each of the KPIs is a timeseries of KPI values, clustering the KPIs accessed to obtain k clusters, each including at least m KPIs,
where m>n and k≥2, and
for each cluster of the k clusters obtained, identifying n representative KPIs in said each cluster as objects of n respective types and buffering KPI values of the n representative KPIs identified in respective ones of the n buffer channels,
feed the KPI values buffered in the n buffer channels into respective input channels of a trained neural network, which further comprises inner neural layers connected by each of the n input channels, for the neural network to independently process the KPIs in the input channels and produce output values in output of the inner layers;
characterize the computerized system based on the output values produced, wherein characterizing the computerized system including detecting an anomaly in the computerized system based upon the output values produced; and
troubleshoot the computerized system by performing a causal analysis based on a selection of the representatives KPIs that have been determined to contribute the most to the anomaly detected.

20. The characterization system according to claim 19, wherein
the n input channels of the neural network are formed by n respective sets of neural layers, whereby the neural network independently processes the KPIs in the n input channels via the n respective sets of neural layers.

21. The characterization system according to claim 20, wherein
the inner layers includes one or more convolutional neural network layers and/or one or more recurrent neural network layers.

22. The characterization system according to claim 19, wherein
n=2, such that the n buffer channels consists of two buffer channels only, these including a first buffer channel and a second buffer channel,
the input channels of the neural network consists of two input channels only, these including a first input channel and a second input channel, and,
in operation, the two representative KPIs identified for said each cluster consist of said central KPI and said peripheral KPI, whereby central KPIs of the k clusters are buffered in the first buffer channel and fed into the first input channel, while peripheral KPIs of the k clusters are buffered in the first channel and fed into the second input channel.

23. A computer program product for characterizing a computerized system based on key performance indicators, or KPIs, for the computerized system, the computer program product comprising a computer readable storage medium having program instructions embodied therewith, the program instructions executable by processing means to cause the latter to:

channel the KPIs through n buffer channels, where n≥2, by
  accessing KPIs, where each of the KPIs is a timeseries of KPI values,
  clustering the KPIs accessed to obtain k clusters, each including at least m KPIs, where m>n and k≥2, and
  for each cluster of the k clusters obtained, identifying n representative KPIs in said each cluster as objects of n respective types and buffering KPI values of the n representative KPIs identified in respective ones of the n buffer channels,
feed the KPI values buffered in the n buffer channels into respective input channels of a trained neural network, which further comprises inner neural layers connected by each of the n input channels, for the neural network to independently process the KPIs in the input channels and produce output values in output of the inner layers;
characterize the computerized system based on the output values produced, characterizing the computerized system including detecting an anomaly in the computerized system based upon the output values produced; and
troubleshoot the computerized system by performing a causal analysis based on a selection of the representatives KPIs that have been determined to contribute the most to the anomaly detected.

* * * * *